US011334852B2

(12) United States Patent
Vas et al.

(10) Patent No.: US 11,334,852 B2
(45) Date of Patent: May 17, 2022

(54) SECURED ATTACHMENT MANAGEMENT

(71) Applicant: AIRWATCH LLC, Atlanta, GA (US)

(72) Inventors: Sachin Vas, Bangalore (IN); Sushilvas Vasavan, Bangalore (IN); Ramani Panchapakesan, Bangalore (IN); Pavithra Narayanaswamy, Bangalore (IN)

(73) Assignee: AirWatch LLC, Atlanta, GA (US)

( * ) Notice: Subject to any disclaimer, the term of this patent is extended or adjusted under 35 U.S.C. 154(b) by 525 days.

(21) Appl. No.: 15/438,779

(22) Filed: Feb. 22, 2017

(65) Prior Publication Data

US 2018/0167399 A1    Jun. 14, 2018

(30) Foreign Application Priority Data

Dec. 8, 2016 (IN) .............................. 201641042036

(51) Int. Cl.
*G06Q 10/10* (2012.01)
*H04L 51/08* (2022.01)
(Continued)

(52) U.S. Cl.
CPC ......... *G06Q 10/1095* (2013.01); *H04L 51/08* (2013.01); *H04L 63/101* (2013.01); *H04L 51/14* (2013.01); *H04L 67/06* (2013.01)

(58) Field of Classification Search
CPC ............. G06Q 10/1095; G06Q 10/107; G06Q 10/109; G06Q 10/06; H04L 51/046; H04L 51/08; H04L 63/101; H04L 29/06
(Continued)

(56) References Cited

U.S. PATENT DOCUMENTS 6,170,014 B1 * 1/2001 Darago ................... G06F 21/10
709/229
7,363,361 B2 * 4/2008 Tewari .................... H04L 12/14
709/223
(Continued)

OTHER PUBLICATIONS

Online in Public Domain, https://admin.kuleuven.be/icts/onderzoek/BOX/end-user-guide.pdf, avilable through google search as "Box User Guide" Created 12/114/2012, Last Modified Feb. 11, 2013 (Year: 2013).*
(Continued)

*Primary Examiner* — Kambiz Zand
*Assistant Examiner* — Mahabub S Ahmed
(74) *Attorney, Agent, or Firm* — Thomas | Horstemeyer LLP

(57) ABSTRACT

The secure management of attachments is described. In one example, files are identified for attachment to a message through a secure content application extension. Rather than directly attaching the files to the message, a resource locator or link to the files is generated, and the resource locator is inserted into the message. The message is then forwarded for distribution to client devices based on an addressee list for the message. The distribution of and access to the files is managed separately by a management service. The management service can notify the client devices to retrieve the files based on a file access schedule. At each of the client devices, users can access the files through a secure content file application extension using the resource locator during the file access schedule. Thus, the files are distributed through secure content file applications and not as direct attachments to messages.

20 Claims, 8 Drawing Sheets

(51) Int. Cl.
*H04L 67/06* (2022.01)
*H04L 51/00* (2022.01)
*H04L 29/06* (2006.01)

(58) Field of Classification Search
USPC .............................................. 726/4
See application file for complete search history.

(56) References Cited

U.S. PATENT DOCUMENTS

| | | | | |
|---|---|---|---|---|
| 7,702,802 | B2* | 4/2010 | Stillion | G06Q 10/00 709/229 |
| 8,732,853 | B1* | 5/2014 | Byrne | H04L 63/08 726/28 |
| 9,049,176 | B2* | 6/2015 | Ferdowsi | |
| 9,268,750 | B2* | 2/2016 | Mishra | G06F 16/94 |
| 9,319,400 | B2* | 4/2016 | Byrne | H04L 29/06809 |
| 9,628,560 | B2* | 4/2017 | Litzenberger | H04W 4/60 |
| 9,860,255 | B2* | 1/2018 | Byrne | H04L 63/0838 |
| 9,864,849 | B2* | 1/2018 | Yang | H04L 65/4069 |
| 9,866,591 | B1 | 1/2018 | Statica et al. | |
| 9,923,851 | B1* | 3/2018 | Sprauve | H04L 51/08 |
| 9,935,963 | B2* | 4/2018 | Kantor | H04L 63/102 |
| 10,200,452 | B2* | 2/2019 | Jagad | H04N 21/8586 |
| 2002/0120607 | A1* | 8/2002 | Price | H04L 67/22 |
| 2004/0064733 | A1* | 4/2004 | Gong | H04L 51/08 726/27 |
| 2004/0243677 | A1* | 12/2004 | Curbow | G06Q 10/107 709/206 |
| 2007/0073810 | A1* | 3/2007 | Adams | H04M 1/72451 709/205 |
| 2007/0168447 | A1* | 7/2007 | Chen | G06Q 10/107 709/207 |
| 2008/0195619 | A1* | 8/2008 | Jain | G06F 21/6227 |
| 2009/0234876 | A1* | 9/2009 | Schigel | H04L 51/02 |
| 2010/0241711 | A1* | 9/2010 | Ansari | H04L 29/12169 709/205 |
| 2012/0239618 | A1* | 9/2012 | Kung | H04L 67/306 707/621 |
| 2012/0331108 | A1* | 12/2012 | Ferdowsi | 709/219 |
| 2014/0122592 | A1* | 5/2014 | Houston | H04L 29/06 709/204 |
| 2014/0123237 | A1* | 5/2014 | Gaudet | H04L 63/08 726/4 |
| 2014/0201285 | A1* | 7/2014 | Kong | H04L 67/325 709/204 |
| 2015/0007264 | A1* | 1/2015 | Maldaner | H04L 67/1097 726/3 |
| 2015/0134751 | A1* | 5/2015 | Meyers, Jr. | H04L 51/08 709/206 |
| 2015/0172330 | A1* | 6/2015 | Kaplan | H04L 67/325 709/206 |
| 2015/0213236 | A1* | 7/2015 | Gorodyansky | G06F 21/6218 726/28 |
| 2015/0222580 | A1* | 8/2015 | Grue | H04L 67/1095 709/206 |
| 2015/0237109 | A1* | 8/2015 | Ferdowsi | 709/203 |
| 2015/0347979 | A1* | 12/2015 | Fasen | G06F 16/955 705/7.19 |
| 2015/0381588 | A1* | 12/2015 | Huang | H04L 67/1097 713/153 |
| 2016/0191432 | A1* | 6/2016 | Panchapakesan | G06F 16/972 709/206 |
| 2016/0203444 | A1* | 7/2016 | Frank | G06F 3/0484 705/7.19 |
| 2016/0212072 | A1* | 7/2016 | Lee | H04L 51/28 |
| 2016/0241608 | A1* | 8/2016 | Kaplan | H04L 51/10 |
| 2016/0285796 | A1* | 9/2016 | Beausoleil | H04L 12/1822 |
| 2017/0046646 | A1* | 2/2017 | Wakefield | H04L 51/18 |
| 2017/0083871 | A1* | 3/2017 | Chang | G06F 16/93 |
| 2017/0140658 | A1* | 5/2017 | Aluvala | G09B 5/02 |
| 2017/0264699 | A1* | 9/2017 | Fushman | H04L 67/22 |
| 2018/0013794 | A1* | 1/2018 | Esary | H04L 63/20 |
| 2018/0097757 | A1* | 4/2018 | Nguyen | G06F 16/182 |
| 2018/0183856 | A1* | 6/2018 | Jagad | H04L 67/06 |

OTHER PUBLICATIONS

Office Action mailed for U.S. Appl. No. 15/438,787.

* cited by examiner

FIG. 2A

New Calendar Event — Send

- To: Bill D.; Maddie P.; Liz P.
- Subject: Product Line Kickoff
- Location: Teleconference (Dial In . . .)
- Start Time: ##-#### ~210
- End Time: ##-#### ~212

[Select Attachment] ~220

Message: Let's discuss some new features to build into the 2017 product line.

FIG. 2B

New Calendar Event — Send

- To: Bill D.; Maddie P.; Liz P.
- Sub[ject]
- Loc[ation]

Content Manager ~230

File  File  File
File  File  File
       File

FIG. 2C

New Calendar Event [Send]

- To: Bill D.; Maddie P.; Liz P.
- Subject: Product Line Kickoff
- Location: Teleconference (Dial In ...)
- Start Time: ##-##### — 210
- End Time: ##-##### — 212
- [Select Attachment] File.odt — 222

*Sharing File.odt is not permitted.* — 240

- Message:
  Let's discuss some new features to build into the 2017 product line.

FIG. 2D

New Calendar Event [Send]

- To: Bill D.; Maddie P.; Liz P.
- Subject: Product Line Kickoff
- Location: Teleconference (Dial In ...)
- Start Time: ##-##### — 210
- End Time: ##-##### — 212
- [Select Attachment] File.odt — 222

*scapp://field={globalFileId}* — 250

- Access Start Time: ##-##### — 260
- Access End Time: ##-##### — 262

- Message:
  Let's discuss some new features to build into the 2017 product line.

I've attached a spreadsheet that covers some of my ideas.

SECURED ATTACHMENT MANAGEMENT

RELATED APPLICATIONS

Benefit is claimed under 35 U.S.C. 119(a)-(d) to Foreign Application Serial No. 201641042036 filed in India entitled "SECURED ATTACHMENT MANAGEMENT", on Dec. 8, 2016, by AIRWATCH LLC, which is herein incorporated in its entirety by reference for all purposes.

The present application is related in subject matter to U.S. patent application Ser. No. 15/438,387, now issued as U.S. Pat. No. 10,542,045, which is incorporated herein by reference.

BACKGROUND

Through a message handling service executing on a computing environment, e-mail, calendar, and other types of messages can be exchanged from one client device to another through computer networks. In that way, e-mail messages can be transferred between client devices for users, and meetings and other events can be defined in the calendars of users. Message handling services typically rely upon standardized protocols for handling mail messages, calendar messages, and data files (e.g., images, documents, spreadsheets, etc.) attached to e-mail, or calendar messages.

A message handling service can include sub-service agents, such as a message transfer agent and a mail submission agent, among others. A message submission agent can receive an e-mail message from a mail agent executing on a client device. When the message submission agent receives the e-mail message from the mail agent, it can interface with a mail transfer agent to distribute the e-mail message to other client devices. Examples of the standardized protocols that can be used for the communication of e-mail messages and attachments between a mail user agent, a message submission agent, and a message transfer agent include the Post Office Protocol (POP3), the Internet Message Access Protocol (IMAP), the Simple Mail Transfer Protocol (SMTP), and the Multipurpose Internet Mail Extensions (MIME).

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

FIG. 2A illustrates an example user interface for secured attachment management according to various examples described herein.

FIG. 2B illustrates the example user interface shown in FIG. 2A along with a content manager interface according to various examples described herein.

FIG. 2C illustrates the example user interface shown in FIG. 2A along with a file sharing permission notification according to various examples described herein.

FIG. 2D illustrates another example user interface for secured attachment management according to various examples described herein.

DETAILED DESCRIPTION

Figure 1:
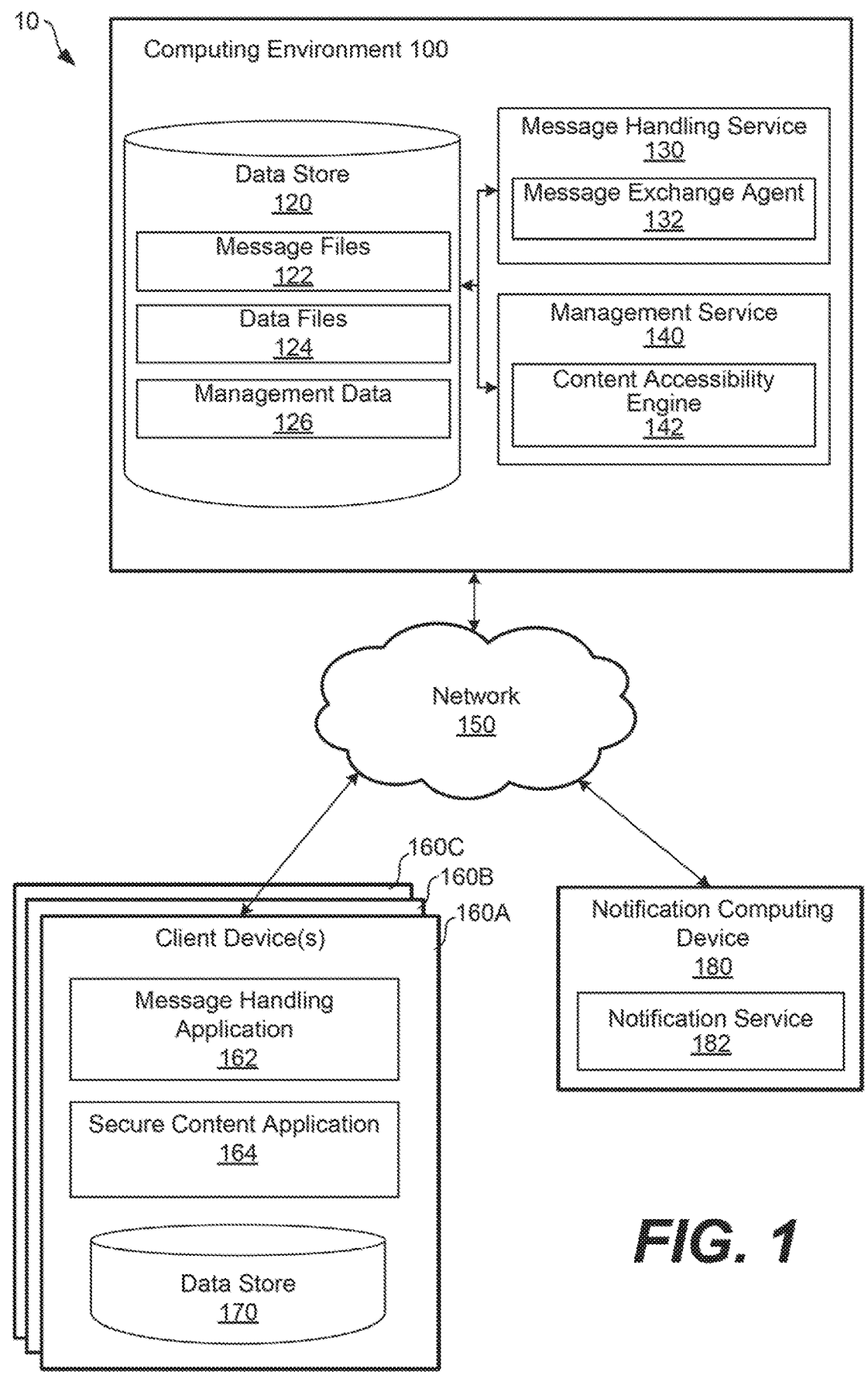
FIG. 1 illustrates an example networked environment for secured attachment management according to various examples described herein.

As noted above, message handling services can be relied upon to distribute e-mail messages, calendar invitations, and other types of messages among various devices. Files can also be attached to e-mail and calendar messages, for example, and those files can be distributed among devices over computer networks by message handling services executing on computing environments. Once a message including an attachment is distributed to a client device of an addressee (i.e., an intended recipient); however, it might not possible to limit the distribution of the attachment to others. Instead, message handling services typically provide unrestricted copies of attachments in e-mail and calendar messages. The unrestricted distribution of files as attachments to e-mail, calendar, and other types of messages can lead to the unwanted, unsecured distribution of files.

Because the unrestricted distribution of files as attachments to e-mail, calendar, and other types of messages is undesirable in many situations, the examples described herein are related to the secure management of attachments to such messages using resource locators. In one example, the content of a message, such as an e-mail or calendar message, is created by a user of a client device using a message handling application. The user can identify one or more files for attachment to the message through an extension to a secure content application. Once the files are identified, the client device can communicate with a management service to confirm any permissions required to share the files. The permissions can be based on various factors, such as whether file sharing is permitted for the client device, whether file sharing is permitted for the user of the client device, and whether the files are permitted to be shared with the addressees (e.g., intended recipients) of the message. Once the permissions to share the files are confirmed, the secure content application can generate a resource locator or link to the files, and the resource locator can be inserted into the message for distribution.

The user of the client device can also define a file access schedule for the files. The file access schedule can be defined according to a schedule associated with an event (e.g., a calendar event, meeting schedule, etc.), a timeframe of an ongoing project, or another predefined schedule that defines a timeframe during which access to the files should be permitted. The file access schedule can also be incorporated into the message being distributed, and the file access schedule can be used to control both the distribution of and access to the files on any client devices to which the message is distributed.

Once a message including a resource locator is generated at one client device, the message can be forwarded over a computer network to a computing environment for distribution to various recipient client devices. In turn, the recipient client devices can retrieve the message from the computing environment.

The distribution of and access to any files referenced by the resource locator in the message, however, is managed separately by a management service of the computing environment. The management service can notify the recipient client devices to retrieve the files and one or more file access schedule policies associated with the files. The recipient client devices can then retrieve the files referenced by the resource locators in the message, along with the file access schedule policies associated with the files.

In turn, users of the recipient client devices can review the message using a message handling application. The users can also access the files referenced by the resource locators through a secure content application extension using the resource locators. In this approach, files can be distributed through secure content applications rather than directly as attachments to messages. Additionally, the timeframe during which the files are accessible can be defined through the messages sent between users. In some cases, after the timeframe for access to the files has concluded or expired, the management service can direct the client devices to delete the files.

In other aspects of the embodiments, a service can monitor and identify any resource locators used to access files during a meeting conducted using computing devices. The service can also record audio discussions among participants during the meeting, and record the contents of any shared display screens during the meeting. At the conclusion of the meeting, the recording can be stored as a file, and a resource locator can be inserted into a meeting message associated with the meeting as a reference to the file. Later, the attendees to the meeting can view the recording of the meeting using the resource locator.

Turning to the drawings, the following paragraphs provide an outline of a networked environment followed by a discussion of the operation of the same. FIG. 1 illustrates an example networked environment 10 for secured attachment management according to various examples described herein. The networked environment 10 includes a computing environment 100, a network 150, a number of client devices 160A-160C (collectively, "client devices 160"), and a notification computing device 180.

The computing environment 100 can be embodied as one or more computers, computing devices, or computing systems. In certain embodiments, the computing environment 100 can include one or more computing devices arranged, for example, in one or more server or computer banks. The computing device or devices can be located at a single installation site or distributed among different geographical locations. The computing environment 100 can include a plurality of computing devices that together embody a hosted computing resource, a grid computing resource, or other distributed computing arrangement. In some cases, the computing environment 100 can be embodied as an elastic computing resource where an allotted capacity of processing, network, storage, or other computing-related resources varies over time. As further described below, the computing environment 100 can also be embodied, in part, as certain functional or logical (e.g., computer-readable instruction) elements or modules. Those elements can be executed to direct the computing environment 100 to perform aspects of secured attachment management as described herein.

As shown in FIG. 1, the computing environment 100 includes a data store 120, a message handling service 130, and a management service 140. The message handling service 130 and management service 140 can interface (e.g., communicate) with each other using application program interface (API) calls or other suitable interface(s). In some cases, the message handling service 130 can execute on a computing environment separate from the computing environment 100 and communicate with the management service 140 over the network 150. The operation of the computing environment 100, including the message handling service 130 and the management service 140, is described in greater detail below.

The network 150 can include the Internet, intranets, extranets, wide area networks (WANs), local area networks (LANs), wired networks, wireless networks, cable networks, satellite networks, other suitable networks, or various combinations thereof. In the networked environment 10, the computing environment 100, the client devices 160, and the notification computing device 180 can communicate with each other over the network 150 using one or more network transfer protocols or interconnect frameworks, such as hypertext transfer protocol (HTTP), simple object access protocol (SOAP), representational stale transfer (REST), real-time transport protocol (RTF), real time streaming protocol (RTSP), real time messaging protocol (RTMP), user datagram protocol (UDP), internet protocol (IP), transmission control protocol (TCP), other protocols and interconnect frameworks, and combinations thereof. Although not shown in FIG. 1, the network 150 can include connections to other network hosts, such as website servers, file servers, cloud computing resources, and other network computing architectures.

Each of the client devices 160 can be embodied as a computing device including one or more processors and memories, such as desktop computers, laptop computers, tablet computers, cellular telephones, wearable computing devices, or similar types of computing devices or systems. Depending upon its primary purpose or function, the client device 160 can include various peripheral devices or components. The peripheral devices can include input or communications devices or modules, such as keyboards, keypads, touch pads, touch screens, microphones, cameras, wireless communications modules (e.g., infra-red, WI-FI, or BLUETOOTH®), buttons, switches, or sensors. The peripheral devices can also include a display, indicator lights, speakers, global positioning system (GPS) circuitry, accelerometers, gyroscopes, or other peripheral devices depending upon the primary purpose or function of the client device 160.

As illustrated in FIG. 1, the client device 160A can execute various applications, such as the message handling application 162 and the secure content application 164, among others. The message handling application 162 can be embodied as a dedicated message handling application or console, such as an e-mail agent application, a messaging agent application, or other related application. In that context, a user of the client device 160A can use the message handling application 162 to compose, edit, distribute, receive, and display e-mail and calendar messages, for example, among other types of messages. In some cases, the message handling application 162 can be accessible to the client device 160A through a hypertext-based network browser, such as the Internet Explorer®, Firefox®, Chrome®, Safari®, or Silk® browsers, among other types of browsers.

The secure content application 164 can be embodied as a secure file manager or browser for various types of files stored on the client device 160A, without limitation. The secure content application 164 can facilitate access to files stored locally on the client device 160A in the data store 170 through the presentation of a user interface on a display of the client device 160A. As further discussed below, the secure content application 164 can also facilitate access to the data files 124 stored in the data store 120 on the computing environment 100 through the presentation of resource locators or links to the data files 124. Thus, through the secure content application 164 and similar secure content applications executing on the client devices 160B and 160C, the client devices 160 can access a number of the data files 124 either locally or remotely in a collaborative fashion. Additionally, when using the message handling application 162 to compose an e-mail or calendar message, for example, a user can reference files stored in the data store 170 and/or in the data files 124 for attachment to the message using an interface generated through an extension to the secure content application 164. An example of a secure file manager interface generated through an extension to the secure content application 164 when using the message handling application 162 is shown in FIG. 2B.

The data store 170 can include a memory area to store files accessible through the secure content application 164, among other files and executable code relied upon for the operation of the client device 160A. Although not shown in FIG. 1, the client devices 160B and 160C can also include functional components similar to the message handling application 162 and the secure content application 164 of the client device 160A. Similarly, the client devices 160B and 160C can include data stores similar to the data store 170 of the client device 160A.

The notification computing device 180 can be embodied as a computing device, system, or environment that provides a notification service 182. In one example, the notification service 182 is configured to transmit notifications to the client devices 160. Using such notifications, the notification service 182 can prompt the client devices 160 to check in with the management service 140. In that context, the notification service 182 can operate as a type of cloud messaging or push notification service capable of sending notifications to the client devices 160.

The client devices 160 can establish an outbound connection with the notification service 182 when powered on and reestablish the outbound connection after a period of network access unavailability. The connection can be persistent and encrypted, but it is not necessary that a persistent or encrypted connection be maintained in all cases or at all times. When the connection between the client devices 160 and the notification service 182 cannot be established or is lost, the client devices 160 can reestablish the connection on another (or a variable) frequency, channel, and/or port by sending a message or request (e.g., hello message, indicator, or request) to the notification service 182. Upon reestablishment of the connection, the notification service 182 can send any notifications or messages that did not reach the client devices 160 during the period of lost connection.

As discussed below, the notifications from the notification service 182 can be used in the context of the management services provided by the computing environment 100 for the client devices 160, to notify the client devices 160 that certain device management commands and or data are queued for retrieval at the computing environment 100. In turn, when one of the client devices 160 receives a notification, it is configured to check in with (e.g., communicate with) the management service 140 of the computing environment 100 to retrieve the contents of the command queue or other data.

Turning back to the computing environment 100, the data store 120 includes memory areas to store message files 122, data files 124, and management data 126, among other types of data. The message files 122 can include e-mail messages, calendar messages, and other types of messages forwarded by one of the client devices 160 for distribution to other ones of fee client devices 160 (or other computing devices and systems). The data files 124 can include any number and type of files, such as document files, spreadsheet files, network page files, database files, and other types of data files, without limitation. The management service 140 can direct the distribution of and access to the data files 124 among the client devices 160 as described in further detail below.

The management data 126 can include device management policies, compliance rules, and configuration data for the management of the client devices 160. The management policies can include the specifications of access rights associated with the client devices 160. For instance, the management policies can define conditions under which particular users are authorized to access particular resources on the client devices 160. In that sense, the management policies can permit or deny access to certain content or data files through the secure content application 164 based on time of day, device geolocation, device network connection, user or user group permissions, device operating system status, conditions, or attributes (e.g., whether a device has been jailbroken), and other factors.

The compliance rules can define one or more remedial actions to potentially take against the client devices 160 when or if it is determined that the client devices 160 fail to comply with device management polices or compliance rules. For example, a compliance rule can specify that certain resources be made inaccessible to the client devices 160 when one or more unauthorized applications are installed on or executed by the client devices 160. As another example, a compliance rule can specify that certain resources be made inaccessible if the operating system of the client devices 160 have been modified (e.g., jailbroken or rooted).

The configuration data can include specifications for the functionality of the client devices 160. In one example, the configuration data can include credentials, such as certificates, profiles, tokens, passwords, PINs, etc. that the client devices 160 should use for authentication or encryption. In another example, the configuration data can include settings that enable, disable, control or modify the functionality (e.g., microphone, camera, wireless capabilities, display, or other functions) of the client devices 160.

As shown in FIG. 1, the message handling service 130 includes the message exchange agent 132. The message handling service 130 can be embodied as an exchange service for the distribution of e-mail messages, calendar messages, and other types of messages between various client devices, such as the client devices 160. The message handling service 130 can operate according to a store-and-forward approach to message exchange. For example, the message exchange agent 132 can receive an e-mail message including an invitee or addressee list from the client device 160A and distribute the e-mail message to one or both of the client devices 160B and 160C according to the addressee list. The distribution of the e-mail message to the client devices 160B and 160C can be facilitated, in part, by storing the e-mail message in mail accounts associated with the client devices 160B and 160C (or users of those client devices) in the message files 122.

To receive the e-mail message from the client device 160A, the client devices 160B and 160C can communicate with the message exchange agent 132 to retrieve a copy of the e-mail message from the client device 160A. In a similar way, the message exchange agent 132 can exchange calendar messages among the client devices 160 (or users of the client devices 160) to schedule and define events in the calendars of the users of the client devices 160. The message handling service 130 is not limited to the exchange of e-mail and calendar messages, however, as the exchange of other types of messages is within the scope of the embodiments. Further, in some cases, the message handling service 130 can execute on a computing environment separate from the computing environment 100 and communicate with the management service 140 over the network 150.

As noted above, the management service 140 can operate as a device administrator for the client devices 160. As the device administrator, the management service 140 can configure various operating settings and parameters of the client devices 160. To begin device management, the client devices 160 can be enrolled for device management by the management service 140. As part of enrollment, the management service 140 can be registered as a device administrator or management agent of the client devices 160. In that role, the management service 140 can have privileges to control certain operations of the client devices 160. In one case, the management service 140 can be registered as the device administrator of the client devices 160 through the installation of a management profile in a profile bank of an operating system of the client devices 160. The installation of the management profile can be conditioned upon a user's acceptance of various terms and conditions related to device management.

In the role of device administrator, the management service 140 can instruct the operating systems of the client devices 160 to perform certain operations, transfer software components or applications to the client devices 160, install and/or configure the software components, and perform other management or administrative tasks on the client devices 160. The management service 140 can also transfer various management policies or compliance rules to the client devices 160 for enforcement on the client devices 160. In that context, during or after enrollment, the management service 140 can retrieve management data from the data store 120 and transfer the management data to the client devices 160. The management data can include a set of management policies, compliance rules, or configuration data for respective ones of the client devices 160A as described herein. When received, the management data can be stored in the data store 170 of the client device 160A or in similar data stores in the client devices 160B and 160C.

The management service 140 includes the content accessibility engine 142. The content accessibility engine 142 is configured to act as an administrator for the accessibility of files through the secure content application 164 on the client device 160A (and similar secure content applications on the client devices 160B and 160C). As the administrator, the content accessibility engine 142 can securely manage access to files through the secure content application 164 on the client device 160A and secure content applications executing on the client devices 160B and 160C. The content accessibility engine 142 can also maintain a listing or schedule of all the files stored in the data files 124, as well as all the files accessible through the secure content application 164 on the client device 160A (and the client devices 160B and 160C, among others). In one example case, the content accessibility engine 142 can identify all files stored in the data files 124 and those accessible through the client devices 160 according to a unique identifier (e.g., a unique, global file ID) of each of files.

As an example of the operation of the content accessibility engine 142, it can instruct the client devices 160 to retrieve a local copy of one or more of the data files 124. For example, the content accessibility engine 142 can instruct the client device 160A to retrieve a local copy of the data files 124 at a certain time or based on a certain schedule and store those data files in the data store 170 for access through the secure content application 164. Additionally or alternatively, the content accessibility engine 142 can instruct the secure content application 164 to populate a resource locator or link to one or more of the data files 124. Thus, through the administration by the content accessibility engine 142, the secure content application 164 can provide accessibility to both local and remotely-stored files in a device-administrated or -managed environment. In some cases, the content accessibility engine 142 can instruct the client devices 160 to retrieve one or more of the data files 124 (or create a resource locator to the data files 124) using a notification provided to the client devices 160 through the notification service 182.

Further, based on the file access policies of the content accessibility engine 142, the secure content application 164 can enforce restrictions on the accessibility to certain files based on various factors. For example, the secure content application 164 can limit accessibility to certain files based on time of day, device geolocators, device network connections, user or user group permissions, device operating system status, conditions, or attributes whether a device has been jailbroken), and other factors. Further, when viewing or editing files opened through the secure content application 164, the secure content application 164 can limit the ability to capture screenshots, copy files, or perform other operations on the client device 160A.

Turning to examples of how secured attachment management can be used to securely distribute files, FIG. 2A illustrates an example user interface 200 for secured attachment management according to various examples described herein. The user interface 200 can be displayed by the message handling application 162 at the client device 160. Particularly, the user interface 200 can be presented by the message handling application 162 to facilitate the creation of a new calendar event message (e.g., calendar or meeting invitation) by a user of the client device 160. The message handling application 162 is not limited to the creation of calendar messages, however, and the concepts of secured attachment management can be extended for use with e-mails and other messages. Thus, although FIGS. 2A-2D are described in the context of a calendar message, the concepts describe herein can be applied to secured attachment management for other types of messages and electronic correspondence.

Among other fields, the user interface 200 can include fields to enter a list of invitees or addressees for the calendar event, a subject for the event, a location for the event, and a message body associated with the event as shown in FIG. 2A. The user interface 200 can also include a start time field 210, an end time field 212, and an attachment icon 220. A user of the client device 160 can complete the fields of the user interface 200 to compose a calendar message, and the calendar message can be forwarded from the message handling application 162 to the message exchange agent 132 over the network 150 for distribution to the client devices of the invitees of the calendar message.

The attachment icon 220 can also be used to identify one or more files for attachment to the calendar message being composed using the user interface 200. In one example case, the files can be identified through an extension to the secure content application 164 invoked from within the message handling application 162 when the attachment icon 220 is selected by a user. In that context, FIG. 2B illustrates an example of a content manager interface 230 presented when the attachment icon 220 is selected. The content manager interface 230 can be presented over the user interlace 200 so that a user can select one or more files for attachment to the calendar message being composed using the user interface 200.

As shown in FIG. 2B, the content manager interface 230 can present a number of files for selection as attachments to the calendar message being composed using the user interface 200. The files being presented can be those stored in the data store 170 and securely managed by the secure content application 164. Once one or more of the files in the content manager interlace 230 are identified or selected by a user, the secure content application 164 can communicate with the management service 140 (or the content accessibility engine 142) to confirm any permissions or conditions required to attach the identified fifes to the calendar message. The permissions can be based on various factors, such as whether file sharing is permitted for the client device 160A, whether file sharing is permitted for the user of the client device 160A, whether the files are permitted to be shared with respective individuals in the list of invitees of the message (or the client devices of those individuals), and other factors. If the management service 140 determines that the files cannot be attached to are not permitted, to be shared by) the calendar message for any reason, then the management service 140 can return a notification to that effect to the secure content application 164.

FIG. 2C illustrates the user interface 200 along with a sharing permission notification 240 according to various examples described herein. In FIG. 2C, the sharing permission notification 240 indicates that sharing is not permitted for the "File.odt" file. The sharing permission notification 240 can be displayed in the user interface 200 by the message handling application 162, for example, to indicate that the "File.odt" file cannot be attached to the calendar message being composed using the user interface 200.

The sharing permission notification 240 shown in FIG. 2C is provided as one example, and other types of notifications can be relied upon. For example, the sharing permission notification 240 can indicate that sharing is not permitted for the client device 160A, that sharing is not permitted for the user of the client device 160A, that sharing the "File.odt" file is not permitted with one or more respective individuals in the list of invitees of the message (i.e., as listed in the "To:" field), and other related notifications. Based on the sharing permission notification 240, a user may determine that a number of files are not suitable for sharing because of access policies, rules, configuration requirements, or other considerations. In turn, the user can take alternative steps as necessary.

On the other hand, the management service 140 (or the content accessibility engine 142) can confirm that the files identified in the content manager interface 230 are permitted to be attached to the calendar message composed using the user interface 200. In that case, the secure content application 164 can generate a resource locator or link to the identified files, and the resource locator can be inserted into the message being composed by the message handling application 162.

FIG. 2D illustrates another example of the user interface 200 including a resource locator 250 to the "File.odt" file. The resource locator 250 can be generated by the secure content application 164 after the management service 340 (or the content accessibility engine 142) has confirmed that the "File.odt" file is permitted to be attached to or shared through the calendar message being composed using the user interface 200. Once the resource locator 250 is generated, the message handling application 162 can insert the resource locator 250 into the calendar message. In turn, the calendar message can be forwarded to the message exchange agent 132 for distribution to the invitees of the calendar message. Thus, rather than directly attaching the "File.odt" file to the calendar message being composed using the user interface 200, the message handling application 162 can insert the resource locator 250 into the calendar message.

In the example shown in FIG. 2D, the resource locator 250 is a custom uniform resource locator (URL) that, when followed on the client devices 160B and 160C, for example, directs them to invoke a secure content application similar to the secure content application 164 on the client device 160A. The resource locator 250 also uniquely identifies the "File.odt" to the secure content applications on the client devices 160B and 160C using an environment-unique file identifier. As discussed above, the environment-unique file identifier can uniquely identify the same "File.odt" file for all managed applications executed on all the client devices 160 and the computing environment 100.

The resource locator 250 shown in FIG. 2D is provided as an example. The resource locator 250 can be formatted in any suitable way, with or without the use of unique global or environment-unique file identifiers. Further, the resource locator 250 can link or point to any number of files, or a number of resource locators similar to the resource locator 250 can be used to link to a number of different files. Additionally, as described in further detail below, the resource locator 250 can link to files on one or more of the client devices 160 and/or on the computing environment 100.

The user interface 200 can also be used to define a file access schedule for access to the "File.odt" file using the resource locator 250. In one example, the file access schedule can be defined according to the start time field 210 and the end time field 212 in the user interface 200. In that case, the management service 140 and the secure content application 164 (and similar secure content applications on the client devices 160B and 160C) can limit access to the "File.odt" file from a time period starting at the start time field 210 and ending at the end time field 212.

The file access schedule can be based on other factors, however, such as a timeframe of an ongoing project, a product deadline, or another predefined schedule. In the example shown in FIG. 2D, the file access schedule can be separately defined using the access start time field 260 and the access end time field 262. The access start time field 260 and the access end time field 262 can be, respectively, the same as or different than the start time field 210 and the end time field 212 for the calendar event. In that case, the management service 140 and the secure content application 164 (and similar secure content applications on the client devices 160B and 160C) can limit access to the "File.odt" file from a time period starting at the access start time field 260 and ending at the access end time field 262.

When the fields of the user interface 200 are complete and the send instruction is received, the message handling application 162 can generate a calendar message using the invitee list, subject, location, message body, start time, end time, file access schedule, resource locator 250, and any other information gathered using the user interlace 200. Then, the message handling application 162 can forward the calendar message to the message exchange agent 132 and/or the management service 140 for distribution to the client devices 160B and 160C (among others) based on the invitee list for the message. When the calendar message is received, the message handling service 130 can store it in the message files 122. The message exchange agent 132 can also distribute the calendar message to the client devices 160B and 160C, in part, by storing the calendar message in mail accounts associated with the client devices 160B and 160C. In turn, the client devices 160B and 160C can check in with the computing environment 100 to receive a copy of the calendar message.

Further, after the calendar message is received at the computing environment 100, the content accessibility engine 142 is configured to manage the distribution of and access to the "File.odt" file associated with the resource locator 250 in the calendar message. The "File.odt" file is not directly attached to the calendar message but instead referenced in the calendar message through resource locator 250. Based on that reference, the content accessibility engine 142 can distribute a copy of the "File.odt" file to each of the devices to which the calendar message is directed according to the invitee list in the message. That is, if the calendar message is directed to the client devices 160B and 160C (or users of those client devices), the content accessibility engine 142 can determine whether the "File.odt" file is stored locally on the client devices 160B and 160C. If the "File.odt" file is not stored locally on the client devices 160B and 160C, the content accessibility engine 142 can notify the client devices 160B and 160C to check in with the computing environment 100 and retrieve the "File.odt" file using the notification service 182. When the client devices 160B and 160C to check in to retrieve the "File.odt" file from the computing environment 100, the client devices 160B and 160C can store the file locally for access through secure content applications executing on the client devices 160B and 160C (similar to the secure content application 164 executing on the client device 160).

The content accessibility engine 142 can also distribute a file access schedule policy to the client devices 160B and 160C. The file access schedule policy can be defined according to the start time field 210 and the end time field 212 in the user interface 200 described above with reference to FIG. 2O. The file access schedule policy can be based on other factors, however, such as a timeframe of an ongoing project, a product deadline, or another predefined schedule. According to the example shown in FIG. 2D, the file access schedule policy can be defined according to the access start time field 260 and the access end time field 262. The access start time field 260 and the access end time field 262 can be, respectively, the same as or different than the start time field 210 and the end time field 212 for the calendar event. Thus, the management service 140 and the similar secure content applications on the client devices 160B and 160C can limit access to the "File.odt" file based on the file access schedule policy.

Figures 2E, 2F:
FIG. 2E illustrates another example user interface for secured attachment management according to various examples described herein.
FIG. 2F illustrates an example content manager notification for secured attachment management according to various examples described herein.

FIG. 2E illustrates another example user interface 270 for secured attachment management according to various examples described herein. The user interface 270 is representative of an interface that can be presented at the client device 160B, for example, based on the calendar message generated using the user interface 200. As shown, the user interface 270 does not provide a copy of the "File.odt" file. Instead, it includes the resource locator 250 which links or points to the "File.odt" file. From the user interface 270, the resource locator 250 can provide access to the "File.odt" file through an extension to a secure content application executing on the client device 160B. From the secure content application executing on the client device 160B, a locally-stored copy of the "File.odt" file can be accessed. Alternatively, a copy of the "File.odt" file can be accessed from the data files 124 on the computing environment 100 over the network 150. In either case, access to the "File.odt" file can be managed by the management service 140 and/or the secure content application executing on the client device 160B.

According to the example shown in FIG. 2E, the user interface 270 includes an access schedule notification 272 associated with the "File.odt" file. As shown, the access schedule notification 272 indicates that the "File.odt" file will become accessible at a certain time. The access schedule notification 272 can present the file access schedule for the "File.odt" file as it was defined in the user interface 200 and as it will be enforced according to the file access schedule policy generated for the client device 160B by the management service 140. In that content, the file access schedule can be related to the scheduled time for a meeting or calendar event or other schedule defined in the user interface 200 as described above.

In other aspects of the embodiments, a service can monitor and identify any resource locators used to access files during a meeting conducted using the client devices 160, among others. The service can also record audio discussions among participants during the meeting, and record the contents of any shared display screens during the meeting. At the conclusion of the meeting, the recording can be stored in the data files 124, and a resource locator to the recording can be inserted into a meeting message associated with the meeting. As shown in FIG. 2E, for example, the resource locator 274 can be inserted into a meeting message, which is presented in the user interface 270 as a reference to the recording stored in the data files 124 after the meeting has concluded.

FIG. 2F illustrates an example content manager notification 280 for secured attachment management according to various examples described herein. As noted above, the content accessibility engine 142 can notify the client device 160B to check in and retrieve the "File.odt" file from the computing environment 100 using the notification service 182. Once the client device 160B checks in to retrieve the "File.odt" file, the operating system of the client device 160B can present the content manager notification 280 to inform a user of the client device 160B that the "File.odt" file has been retrieved and, if applicable, when the "File.odt" file will become accessible. A notification similar to the content manager notification 280 can be presented at some time before (e.g., 10 minutes, 15 minutes, etc.) the "File.odt" file will become accessible, or at any other appropriate time.

The content accessibility engine 142 can also distribute a file access schedule policy to the client devices 160B and 160C. The file access schedule policy can be defined according to the start time field 210 and the end time field 212 in the user interface 200 described above with reference to FIG. 2C. The file access schedule policy can be based on other factors, however, such as a timeframe of an ongoing project, a product deadline, or another predefined schedule. According to the example shown in FIG. 2D, the file access schedule policy can be defined according to the access start time field 260 and the access end time field 262. The access start time field 260 and the access end time field 262 can be, respectively, the same as or different than the start time field 210 and the end time field 212 for the calendar event. Thus, the management service 140 and the similar secure content applications on the client devices 160B and 160C can limit access to the "File.odt" file based on the file access schedule policy.

Turning to additional aspects of the disclosure, FIGS. 3, 4A, 4B, and 5 illustrate processes for secured attachment management according to various examples described herein. The processes illustrated in FIGS. 3, 4A, 4B, and 5 are described in connection with computing environment 100, client devices 160, and notification computing device 180 in the networked environment 10 shown in FIG. 1, although other devices in other networked environments could perform the processes. Further, where certain process steps are described below as being performed by a particular computing environment or device, one or more services, engines, or functional components executing on that computing environment or device can be relied upon, in part, to perform the process steps. Additionally, although the flowcharts show an order of execution, the order of execution can differ from that which is shown. For example, the order of execution of two or more elements can be switched relative to the order shown. As other examples, two or more elements shown in succession can be executed concurrently or with partial concurrence, and one or more of the elements can be skipped or omitted.

Figure 3:
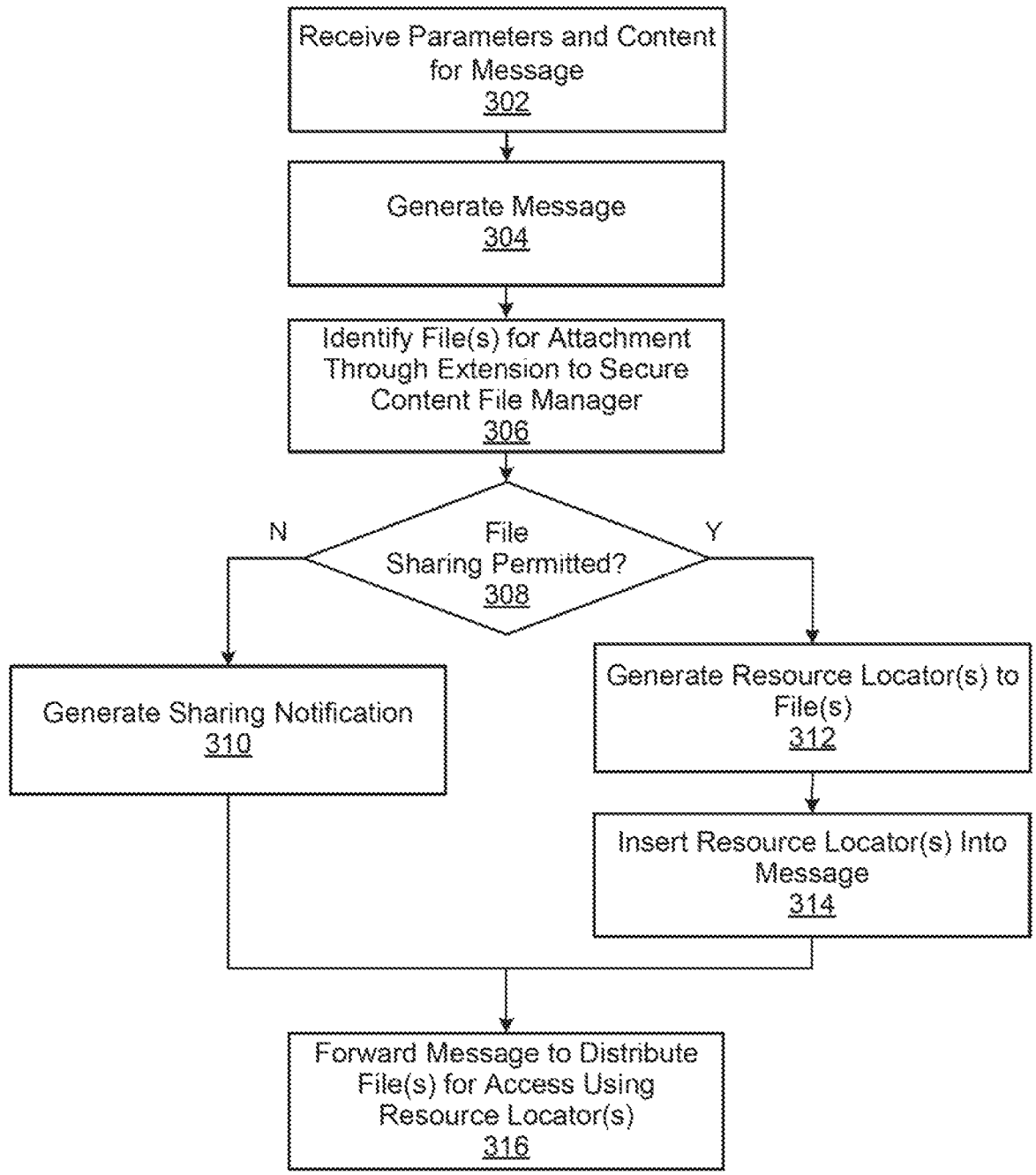
FIG. 3 illustrates a process for secured content attachment message generation according to various examples described herein.

Starting with FIG. 3, a process for the generation of a secured content, attachment message is illustrated. At step 302, the process can include the message handling application 162 receiving parameters and content for a message. The parameters and content for the message can be received or gathered through the user interface 200 shown in FIGS. 2A-2D, for example, at the client device 160A. As described above, the user interface 200 can include fields to enter a list of invitees for the calendar event a subject for the event, a location for the event, and a message body, among other fields. The user interface 200 can also include a start time field 210, an end time field 212, an attachment icon 220, an access start time field 260, and an access end time field 262, among others. A user of the client device 160A can complete the fields of the user interlace 200 to compose a calendar message. The message handling application 162 is not limited to receiving parameters and content for calendar messages at step 302, however, as the message handling application 162 can receive content for other types and forms of messages.

At step 304, the process can include the message handling application 162 generating a message based on the parameters and content received at step 302. For example, the message handling application 162 can generate an e-mail, calendar, or other type of message using the parameters and content received at step 302. The message can include an invitee or addressee list, subject, message body, start time, end time, file access schedule, resource locators, and any other information gathered using the user interface 200. In some cases, the message handling application 162 can generate the message at a later stage in the process flow shown in FIG. 3, such as after any files are identified for attachment to the message at step 306.

At step 306, the process includes identifying one or more files for attachment to the message generated at step 304 through an extension to the secure content application 164. According to the example described above with reference to FIGS. 2A and 2B, the attachment icon 220 in the user interface 200 can be used to invoke or call an extension to the secure content application 164 from within the message handling application 162. In that context, FIG. 2B illustrates an example of a content manager interface 230 presented by the secure content application 164. As noted above, the secure content application 164 can be embodied as a secure file manager or browser for files stored in the data store 170 on the client device 160A and, in some cases, in the data files 124 on the computing environment 100. Thus, the secure content application 164, through the content manager interface 230, can facilitate access to files stored locally on the client device 160A and stored remotely on the computing environment 100.

At step 308, the process can include the secure content application 164 determining whether the files identified at step 306 are permitted to be shared. To make that determination, the secure content application 164 can communicate with the management service 140 (and/or the contort accessibility engine 142) to confirm any permissions or conditions required to attach the files identified at step 306 to the message generated at step 304. The permissions can be based on various factors, such as whether file sharing is permitted for the client device 160A, whether file sharing is permitted for the user of the client device 160A, whether the files are permitted to be shared with one or more of the respective individuals to which the message is addressed, and other factors.

If the management service 140 determines for any reason at step 308 that the files identified at step 306 cannot be attached to the message generated at step 304, then the management service 140 can return a notification to that effect to the secure content application 164, and the process can proceed to step 310.

At step 310, the process includes the message handling application 162 generating a sharing notification. For example, FIG. 2C illustrates the user interlace 200 along with a sharing permission notification 240. The sharing permission notification 240 indicates that sharing is not permitted for the "File.odt" file. The sharing permission notification 240 can be displayed in the user interface 200 to indicate that the "File.odt" file cannot be attached to the message generated at step 304. The sharing permission notification 240 shown in FIG. 2C is provided as one example, and other types of notifications can be relied upon. For example, the sharing permission notification 240 can indicate that sharing is not permitted for the client device 160A, that sharing is not permitted for the user of the client device 160A, that sharing the "File.odt" file is not permitted with one or more individuals to which the message is addressed, and other related notifications.

On the other hand, if the management service 140 determines at step 308 that the files identified at step 306 are permitted to be attached to the message generated at step 304, then the management service 140 can return such a notification to the secure content application 164, and the process can proceed to step 312.

At step 312, the process can include the secure content application 164 generating one or more resource locators or links to the files identified at step 306. The resource locator 250 shown in FIG. 2D, for example, is a custom URL generated by the secure content application 164 that, when followed, directs devices to invoke a secure content application for access to the "File.odt" file. The resource locator 250 uniquely identifies the "File.odt" file using an environment-unique global file identifier. The environment-unique global file identifier can be recognized by (or identify the same file for) all managed applications executed by the client devices managed by the management service 140 in the networked environment 10. Thus, the environment-unique global file identifier can uniquely identify the same "File.odt" file on all the client devices 160 and the computing environment 100 in the networked environment 10.

At step 314, the process can include the message handling application 162 inserting the resource locators generated at step 312 into the message generated at step 304. The message handling application 162 can insert the resource locators generated at step 312 into the body, header, or other suitable location of the message generated at step 304. Thus, rather than directly attaching the files identified at step 306 to the message generated at step 304, the message handling application 162 can insert the resource locators into the message.

At step 316, the process can include the message handling application 162 forwarding the message to the message exchange agent 132 and/or the management service 140 for distribution. More particularly, when the fields of the user interface 200 are complete and the send instruction is received at the client device 160A, the message handling application 162 can complete the message and forward it to the message exchange agent 132 for distribution. The completed message, ready to be distributed, can include an invitee or addressee list, subject, message body, start time, end time, file access schedule, resource locators, and any other information gathered using the user interface 200.

Figure 4A:
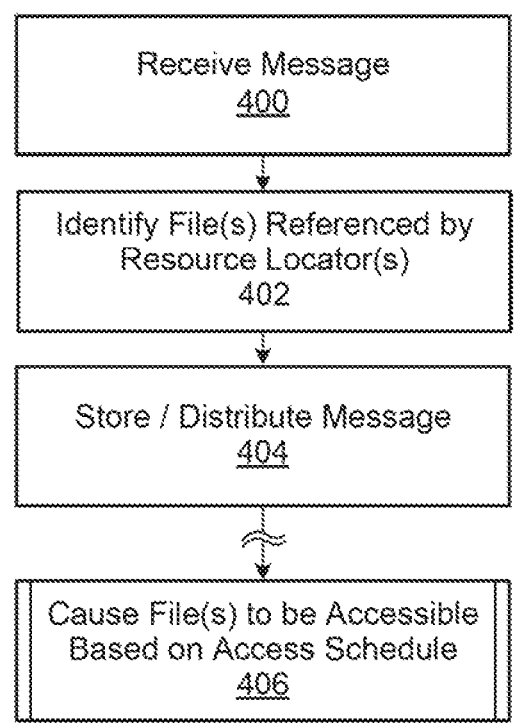
FIGS. 4A and 4B illustrate a process for secured content attachment message distribution according to various examples described herein.
Figure 4B:
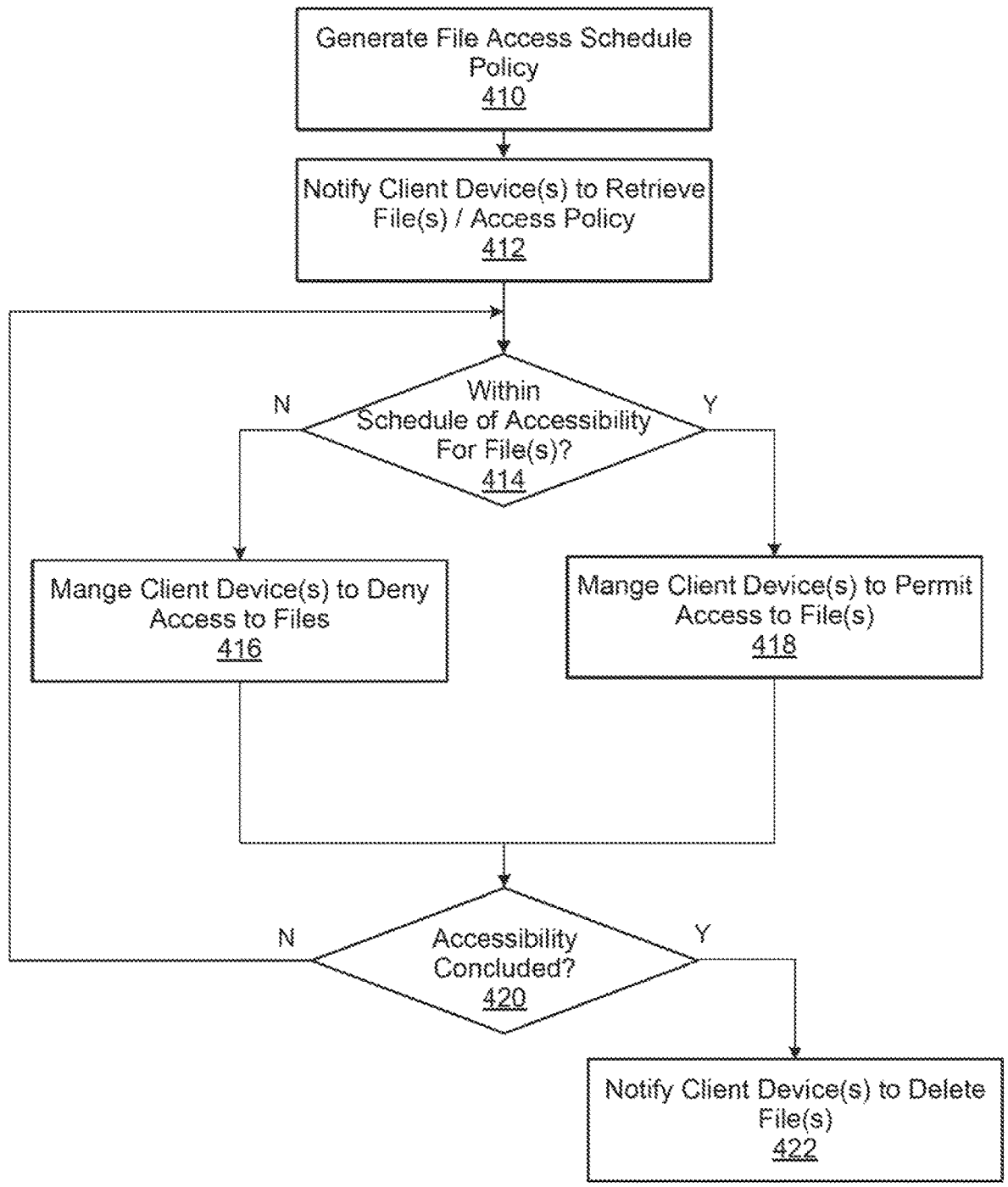

After the process shown in FIG. 3, the distribution of and access to the files identified at step 306 can be managed separately by the management service 140 as described in FIGS. 4A and 4B. Referring to FIG. 4A, at step 400, the process can include the message exchange agent 132 and/or the management service 140 receiving the message from the message handling application 162 of the client device 160A. The message can include an invitee or addressee list, subject, message body, start time, end time, file access schedule, resource locators, and other related information. The message can be received over the network 150 using any suitable protocol for the communication of e-mail, calendar, or other types of messages, such as the POP3, IMAP, SMTP, and MIME protocols, among others.

At step 402, the process can include the content accessibility engine 142 identifying the files referenced by the one or more resource locators included in the message received at step 400. The files can be identified using the one or more unique global file identifiers in the resource locators. As described herein, the unique global file identifiers uniquely identify certain files in the date files 124 so that they can be distributed to client computing devices in a managed, secure manner.

At step 404, the process can include the message exchange agent 132 storing the message in the message files 122 so that it can be distributed to the client devices 160B and 160C, among others. The message exchange agent 132 can thus facilitate the distribution of the message to the client devices 160B and 160C by storing the calendar message in mail accounts associated with the client devices 160B and 160C, for example, or based on other message exchange protocols or methods. In turn, the client devices 160B and 160C can check in with the computing environment 100 to retrieve a copy of the message.

In some cases, unmanaged client devices (e.g., other than the client devices 160B and 160C) can check in with the computing environment 100 to retrieve a copy of a message from the message exchange agent 132. For those unmanaged client devices, however, a resource locator in the message may not be used as a file reference because the unmanaged client devices do not include a secure content application for file management. In other words, unmanaged client devices cannot recognize global file identifiers as described herein because they do not include a secure content application. In that case, when an unmanaged client device checks in to retrieve a copy of a message, the message exchange agent 132 can provide a copy of the message without the resource locator. Alternatively, the message exchange agent 132 can provide a copy of the message along with the attachment of the file referenced by the resource locator rather than or in addition to the resource locator. In other cases, the message exchange agent 132 can provide a copy of the message with the attachment of the file on the condition that the file access schedule policy for the file permits access at the time when the message is requested by the unmanaged device.

At step 406, the process can include the content accessibility engine 142 causing the files identified at step 402 to be accessible through the client devices 160B and 160C. The content accessibility engine 142 can cause the files to be accessible during a certain timeframe or schedule according to a file access schedule policy enforced by the management service 140. The timeframe or schedule can be defined according to the start and end times for an event or another file access schedule defined in the message.

The process for causing the files to be accessible at step 406 is described in greater detail with reference to FIG. 4B. At step 410 in FIG. 4B, the process can include the content accessibility engine 142 generating a file access schedule policy. The file access schedule policy can be referenced by the secure content applications executing on the client devices 160B and 160C to determine when access should be permitted to the files referenced by the resource locators in the message distributed to the client devices 160B and 160C.

The file access schedule policy can be defined according to the start time field 210 and the end time field 212 in the user interface 200 shown in FIG. 2C, for example, as that data was included in the message received at step 400. The file access schedule policy can be based on other factors, however, such as a timeframe of an ongoing project, a product deadline, or another predefined schedule. According to another example shown in FIG. 2D, the file access schedule policy can be defined according to the access start time field 260 and the access end time field 262. The access start time field 260 and the access end time field 262 can be, respectively, the same as or different than the start time field 210 and the end time field 212 for the calendar event.

At step 412, the process can include the management service 140 notifying the client devices 160B and 160C to retrieve the files identified at step 402. The process can also include the management service 140 notifying the client devices 160B and 160C to retrieve the file access schedule policy generated at step 410. As one example, the management service 140 can notify the client devices 160B and 160C using the notification service 182. To that end, the management service 140 can instruct the notification service 182 to transmit notifications to the client devices 160B and 160C.

In response to the notifications from the notification service 182, the client devices 160B and 16C can check in with (e.g., communicate with) the management service 140 to retrieve the files identified at step 402 and/or the file access schedule policy generated at step 410. Further details related to how the client devices 160A and 160B receive and respond to notifications is described in detail below with reference to FIG. 5. When the client devices 160A and 160B do check in, instructions to retrieve the files and/or the file access schedule policy can be contained in a command queue maintained by the management service 140. The use of a command queue is not necessary in every case, however. Similarly, the use of the notification service 182 is not necessary in all cases to transfer the files and file access schedule policy to the client devices 160A and 160B.

In some cases, it might not be necessary to notify one or both of the client devices 160A and 160B at step 412. For example, the management service 140 can identify whether the files referenced by the resource locators in the message are already stored locally at the client devices 160A and 160B. If so, it is not necessary tor the client devices 160A and 160B to retrieve the files. Similarly, the management service 140 can identify whether the client devices 160A and 160B (or the users of those client devices) are permitted unconditional or permanent access to the files. In that case, it is not necessary for the client devices 160A and 160B to retrieve the file access schedule policy.

At step 414, the process can include the content accessibility engine 142 determining whether the current time is within the file access schedule policy generated at step 410. The file access schedule policy can be defined according to the start time field 210 and the end time field 212 in the user interface 200 shown in FIG. 2C, the access start time field 260 and the access end time field 262 shown in FIG. 2B, or another schedule. Thus, at step 414, the process can include the content accessibility engine 142 determining whether the current time is within the start time field 210 and the end time field 212, for example, or within the access start time field 260 and the access end time field 262. If not the process proceeds to step 416. If so, the process proceeds to step 418.

At step 416, the process can include the content accessibility engine 142 managing the secure content applications executing on the client devices 160B and 160C to deny access to the files referenced by the resource locators. For example, if a user of one of the client devices 160B and 160C attempts to open or access one of the files through the secure content applications executing on the client devices 160B and 160C, the content accessibility engine 142 can direct the secure content applications to deny access. In some cases, the secure content applications executing on the client devices 160B and 160C can deny access without the need for direct management by the content accessibility engine 142. For example, the secure content applications can deny access based on the file access schedule policy generated by the content accessibility engine 142 at step 410.

At step 418, the process can include the content accessibility engine 142 managing the secure content applications executing on the client devices 160B and 160C to allow access to the files referenced by the resource locators. For example, if a user of one of the client devices 160B and 160C attempts to open or access one of the files through the secure content applications executing on the client devices 160B and 160C, the content accessibility engine 142 can direct the secure content applications to allow access. In some cases, the secure content applications executing on the client devices 160B and 160C can allow access without the need for direct management by the content accessibility engine 142 based on the file access schedule policy.

At step 420, the process can include the content accessibility engine 142 determining whether the period of accessibly according to the file access schedule policy generated at step 410 is concluded. The file access schedule policy can be defined according to the start time field 210 and the end time field 212 in the user interface 200 shown in FIG. 2C, the access start time field 260 and the access end time field 262 shown in FIG. 2D, or another schedule. Thus, at step 420, the process can include the content accessibility engine 142 determining whether the current time is outside the start time field 210 and the end time field 212, for example, or outside the access start time field 260 and the access end time field 262. If not, the process proceeds back to step 414. If so, the process proceeds to step 422.

As step 422, the process includes the management service 140 notifying the client devices 160B and 160C to delete the files retrieved in response to the notification at step 412. The management service 140 can notify the client devices 160B and 160C using the notification service 182, for example, but the use of the notification service 182 is not necessary in every case. It might not be necessary to notify one or both of the client devices 160A and 160B at step 422. For example, the client devices 160A and 160B (or the users of those client devices) might be permitted unconditional or permanent access to the files. In that case, it is not necessary for the client devices 160A and 160B to delete the files.

Figure 5:
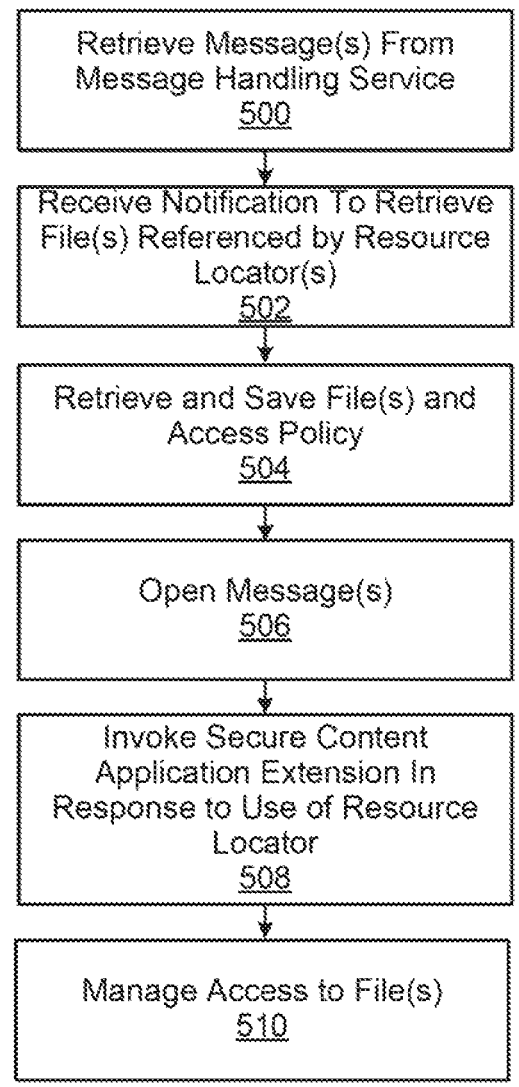
FIG. 5 illustrates a process for client-side secured content attachment message processing according to various examples described herein.

FIG. 5 illustrates a process for client-side secured content attachment message processing according to various examples described herein. The process steps in FIG. 5 are described in connection with the client device 160B although they can be performed by other client devices. At step 500, the process includes the message handling application 162 of the client device 160B retrieving one or more messages from the message exchange agent 132 on the computing environment 100. The messages can be retrieved front the message files 122, for example, using any suitable protocol for the communication of e-mail, calendar, or other types of messages, and saved locally at the client device 160B. According to the concepts described herein, the messaged can include one or more resource locators to files.

At some time later, at step 502, the process can include the client device 160B receiving a notification to retrieve one or more of the files referenced by the resource locators in the messages retrieved at step 500. The notification can be received from the notification service 182, for example, and direct the client device 160B to check in with the management service 140.

At step 504, the process includes the client device 160B checking in to retrieve the files referenced by the resource locators from the computing environment 100. The client device 160B can also retrieve the file access schedule policy associated with the files. The file access schedule policy can be referenced by the secure content application executing on the client device 160B to determine when access should be permitted to the files. When the client device 160B does check in, instructions to retrieve the files and the file access schedule policy can be contained in a command queue maintained fay the management service 140. The use of a command queue is not necessary in every case, however.

At step 506, the process can include a message handling application on the client device 160B (similar to the message handling application 162 on the client device 160A) opening one or more of the messages retrieved and saved at step 500. As one example, FIG. 2E illustrates the user interface 270, which can be presented upon opening a calendar message. As shown, the user interface 270 does not provide a copy of the "File.odt" file. Instead, it includes the resource locator 250 which links or points to the "File.odt" file.

At step 508, the process includes the message handling application on the client device 160B invoking a secure content application extension in response to the use of (e.g., click, attempt to open, etc.) one of the resource locators in the messages retrieved at step 500. The secure content application can then display a user interface, similar to the content manager interface 230 shown in FIG. 2B, that presents the files referenced by the resource locators. Through the user interface, a locally-stored copy of the files retrieved at step 502 can be presented. Alternatively, the user interface can present a link to the files as they are stored in the data files 124 on the computing environment 100.

In either case, at step 510, the process includes the secure content application on the client device 160B managing access to the files presented in the user interface. Access can be managed by the secure content application executing on the client device 160B based on the file access schedule policy retrieved at step 504. Thus, access can be permitted or denied based on whether the current time is within that permitted for access by the file access schedule policy retrieved at step 502. If not, access to the files can be denied. If so, access to the files can be permitted. In some cases, access can be managed by the secure content application on the client device 160B at the direction of the content accessibility engine 142 on the computing environment 100.

As part of managing access at step 510, the process can also include the secure content application notifying a user of the client device 160B that access to certain files is permitted, as discussed above with reference to FIG. 2F. Additionally, the process can also include the secure content application deleting one or more of the files from the client device 160B if the period of accessibly for those files has concluded according to their associated file access schedule policy.

The flowcharts in FIGS. 3, 4A, 4B, and 5 show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

The computing environment 100 can include at least one processing circuit. Such a processing circuit can include, for example, one or more processors and one or more storage devices that are coupled to a local interface. The local interface can include, for example, a data bus with an accompanying address/control bus or any other suitable bus structure.

The storage devices for a processing circuit can store data or components that are executable by the processors of the processing circuit. For example, the message handling service 13, the management service 140, and/or other components can be stored in one or more storage devices and be executable by one or more processors in the computing environment 100. Also, a data store, such as the data store 120 can be stored in the one or more storage devices.

The message handling service 13, the management service 140, and/or other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein, including the message handling service 13, the management service 140, and/or other components can be implemented and structured in a variety of ways. For example, one or more applications described can be implemented as modules or components of a single application. Further, one or more application's described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

What is claimed is:

1. A method, comprising:
  receiving, by at least one computing device, an invitee list and a schedule associated with an event;
  generating, by the at least one computing device, a calendar message for the event based on the invitee list and the schedule;
  identifying, by the at least one computing device, a file for attachment to the calendar message;
  determining, by the at least one computing device, that the file is permitted to be shared with at least one addressee identified in the invitee list based on an access policy of a management service in a managed computing device environment;
  generating, by the at least one computing device, a resource locator associated with the file, wherein the resource locator uniquely identifies the file in the managed computing device environment;
  inserting, by the at least one computing device, the resource locator into the calendar message;
  forwarding, by the at least one computing device, the calendar message to at least one managed computing device in the managed computing device environment based on at least one addressee in the invitee list, to distribute the resource locator for access to the file; and retrieving the file, by the at least one computing device and in response to receiving a notification, at a time before an access start time associated with the access to the file using a secure content file manager.

2. The method according to claim 1, wherein the determining comprises communicating, by the at least one computing device, over a computer network with the management service on a remote computing environment.

3. The method according to claim 1, wherein the determining comprises determining, by the at least one computing device, that the file is permitted to be shared based on the access policy of the management service and an operating parameter of the at least one managed computing device.

4. The method according to claim 1, wherein the determining comprises determining, by the at least one computing device, that the file is permitted to be shared with individual addressees identified in the invitee list.

5. The method according to claim 1, further comprising:
identifying, by the at least one computing device, an other file for attachment to the calendar message;
determining, by the at least one computing device, that the other file is not permitted to be shared with at least one addressee identified in the invitee list based on the access policy of the management service; and
generating, by the at least one computing device, a sharing restriction notification in response to determining that the other file is not permitted to be shared.

6. The method according to claim 1, further comprising:
receiving, by the at least one computing device, a file access schedule associated with the file and comprising the access start time, wherein the access start time begins before a start of the schedule associated with the event; and
inserting, by the at least one computing device, the file access schedule into the calendar message.

7. The method according to claim 6, wherein the file access schedule further comprises a period of time that ends after an end of the schedule associated with the event.

8. The method according to claim 1, wherein the resource locator comprises an environment-unique file identifier recognized uniquely among a plurality of managed applications executed by a plurality of managed computing devices in the managed computing device environment.

9. A non-transitory computer-readable medium embodying program code executable in at least one computing device that, when executed by the at least one computing device, directs the at least one computing device to at least:
receive an addressee list and a message body associated with a message;
generate the message based on the addressee list;
identify a file for attachment to the message;
determine whether the file is permitted to be shared with at least one addressee identified in the addressee list based on an access policy of a management service in a managed computing device environment;
generate a resource locator associated with the file and insert the resource locator into the message in response to a determination that the file is permitted to be shared;
forward the message to at least one managed computing device in the managed computing device environment based on at least one addressee in the addressee list, to distribute the resource locator for access to the file; and
retrieve the file, in response to receiving a notification, at a time before an access start time associated with the access to the file using a secure content file manager.

10. The non-transitory computer-readable medium according to claim 9, wherein, to determine whether the file is permitted to be shared, the at least one computing device is further configured to communicate over a computer network with the management service on a remote computing environment.

11. The non-transitory computer-readable medium according to claim 9, wherein the at least one computing device is configured to determine whether the file is permitted to be shared based on the access policy of the management service and an operating parameter of the at least one managed computing device.

12. The non-transitory computer-readable medium according to claim 9, wherein the at least one computing device is further configured to determine whether the file is permitted to be shared with individual addressees identified in the addressee list.

13. The non-transitory computer-readable medium according to claim 9, wherein the at least one computing device is further configured to generate a sharing restriction notification in response to a determination that the file is not permitted to be shared.

14. The non-transitory computer-readable medium according to claim 9, wherein the at least one computing device is further configured to receive a file access schedule associated with the file and insert the file access schedule into the message.

15. The non-transitory computer-readable medium according to claim 9, wherein the resource locator comprises an environment-unique file identifier recognized uniquely among a plurality of managed applications executed by a plurality of managed computing devices in the managed computing device environment.

16. A system, comprising:
a memory device configured to store computer-readable instructions thereon; and
at least one computing device configured, through execution of the computer-readable instructions, to:
identify a file for attachment to a message;
determine that the file is permitted to be shared with at least one addressee of the message based on an access policy of a management service in a managed computing device environment;
generate a resource locator to the file, wherein the resource locator uniquely identifies the file in the managed computing device environment;
insert the resource locator into the message;
forward the message to at least one managed computing device in the managed computing device environment based on the at least one addressee of the message, to distribute the resource locator for access to the file; and
retrieve the file, in response to receiving a notification, at a time before an access start time associated with the access to the file using a secure content file manager.

17. The system according to claim 16, wherein the at least one computing device is configured to determine that the file is permitted to be shared based on the access policy of the management service and an operating parameter of the managed computing device.

18. The system according to claim 16, wherein the at least one computing device is further configured to determine that the file is permitted to be shared with individual addressees identified in an addressee list of the message.

19. The system according to claim 16, wherein the at least one computing device is further configured to receive a file access schedule associated with the file and insert the file access schedule into the message.

20. The system according to claim 16, wherein the resource locator to the file comprises an environment-unique file identifier recognized uniquely among a plurality of managed computing devices in the managed computing device environment.

* * * * *